(12) United States Patent
Matsuo et al.

(10) Patent No.: US 7,839,471 B2
(45) Date of Patent: Nov. 23, 2010

(54) TRANSFLECTIVE LIQUID CRYSTAL DEVICE HAVING A WIRE SERPENTINELY BYPASSING A LIGHT-SHIELDING LAYER IN AN INTERPIXEL REGION

(75) Inventors: Mutsumi Matsuo, Azumino (JP);
Katsuhiro Imai, Azumino (JP);
Tomohiko Kojima, Azumino (JP);
Yoshio Yamaguchi, Azumino (JP)

(73) Assignee: Epson Imaging Devices Corporation (JP)

( * ) Notice: Subject to any disclaimer, the term of this patent is extended or adjusted under 35 U.S.C. 154(b) by 753 days.

(21) Appl. No.: 11/686,229

(22) Filed: Mar. 14, 2007

(65) Prior Publication Data
US 2007/0216835 A1    Sep. 20, 2007

(30) Foreign Application Priority Data
Mar. 14, 2006    (JP)    ............... 2006-068766

(51) Int. Cl.
*G02F 1/1335*    (2006.01)
*G02F 1/1333*    (2006.01)
(52) U.S. Cl. .................. 349/114; 349/111; 349/139
(58) Field of Classification Search .................. 349/114
See application file for complete search history.

(56) References Cited

U.S. PATENT DOCUMENTS 6,853,421 B2    2/2005    Sakamoto et al.

2006/0050210 A1*    3/2006    Tsuchiya ................ 349/114
2006/0139525 A1*    6/2006    Ahn et al. ............... 349/114
2006/0221027 A1    10/2006    Ishihara et al.
2006/0256269 A1*    11/2006    Son et al. ............... 349/141
2007/0242196 A1*    10/2007    Yoshida et al. ......... 349/114

FOREIGN PATENT DOCUMENTS

| CN | 1402064 | 3/2003 |
|---|---|---|
| JP | 2000-180881 | 6/2000 |
| JP | 2006-251417 | 9/2006 |
| KR | 1020040012476 | 2/2004 |
| KR | 1020050034138 A | 4/2005 |
| KR | 1020050042523 | 5/2005 |
| WO | WO 2006009034 A1 * | 1/2006 |

* cited by examiner

*Primary Examiner*—Andrew Schechter
*Assistant Examiner*—Paul C Lee
(74) *Attorney, Agent, or Firm*—Lowe Hauptman Ham & Berner, LLP

(57) ABSTRACT

A liquid crystal device has a plurality of pixels arranged. The liquid crystal device includes a first substrate, a second substrate opposing the first substrate, liquid crystal provided between the first substrate and the second substrate, wires formed on the first substrate, and a reflective layer formed on the first substrate. Each pixel has a reflective display region formed by the reflective layer and a transparent display region without the reflective layer, and each wire is routed between two pixels in the transparent display region and in the reflective display region.

1 Claim, 6 Drawing Sheets

TRANSFLECTIVE LIQUID CRYSTAL DEVICE HAVING A WIRE SERPENTINELY BYPASSING A LIGHT-SHIELDING LAYER IN AN INTERPIXEL REGION

BACKGROUND

1. Technical Field

The present invention relates to liquid crystal devices and electronic apparatuses, and in particular, to a liquid crystal device including a reflective display region and a transparent display region.

2. Related Art

In general, there is a known semi-transparent reflective liquid crystal device that realizes reflective display in which a displayed item can be made visible by using reflected light based on external light or the like and transparent display in which a displayed item can be made visible by using transparent light such as backlight. Liquid crystal devices of the above type include, for example, a liquid crystal unit (see, for example, JP-A-2000-180881) including a plurality of pixels arranged in the form of a matrix, each pixel having a reflective display region and transparent display region formed thereon.

The liquid crystal unit has liquid crystal encapsulated between a pair of substrates made of glass. One substrate has a reflective layer formed thereon. Portions of the pixels on which the reflective layer is formed serve as reflective display regions, and other portions of the pixels on which the reflective layer is not formed serve as transparent display regions. In addition, in the reflective display region, the reflective layer is formed, with an interlayer insulating film provided on the substrate, and, in the transparent display region, the interlayer insulating film is not formed. In this structure, the thickness of the liquid crystal in the reflective display region is approximately a half of the thickness of the liquid crystal in the transparent display region. This can reduce a difference between optical modulation levels (retardation) for reflected light used in reflective display and transparent light used in transparent display, whereby their display forms can be optimized.

However, the liquid crystal unit including the reflective display region and the transparent display region has a problem of contrast decrease because outer edges of an interlayer insulating film formed in the reflective display region have a level difference and light leakage easily occurs due to misorientation of liquid crystal.

In particular, a large pixel area (aperture ratio) cannot be set in design because, since it is common to use a configuration in which one substrate has thereon a reflective layer and the other substrate has thereon a shielding layer for light shielding in the interpixel region, a large effect of the light leakage is produced by a possibility that a shift in pair of substrates may cause insufficient light shielding in the interpixel region by the shielding layer, and it is necessary to expand a shielding range of the shielding layer in order to prevent the effect.

For example, an example (comparative example) of the configuration of a liquid crystal device having the above configuration is discussed below. FIG. 6 is a partially enlarged plan view of a pixel structure in the example. As shown in FIG. 6, a pixel SP (subpixel) includes a reflective display region R and a transparent display region T. One substrate has wires 11 and switching elements 12 formed thereon. The switching elements 12 connect to the wires 11. For each switching element 12, a conductive contact portion 13 is provided. An insulating film 14 is formed on the wire 11 and the switching element 12. The insulating film 14 is formed in the reflective display region R, but is not substantially formed in the transparent display region T. The insulating film 14 has a reflective layer 15 formed thereon. The reflective layer 15 is formed of a thin film of a metal such as Al. The reflective layer 15 is also formed in the reflective display region R, but is not formed in the transparent display region T. The reflective layer 15 and the conductive contact portion 13 have a pixel electrode 16 formed thereon. The pixel electrode 16 is formed by a transparent conductor made of ITO (indium tin oxide) or the like. The pixel electrode 16 is formed both in the reflective display region R and in the transparent display region T.

In the above configuration, in an interpixel region between two adjacent pixels SP, a shielding layer 21X that is formed on the other substrate is formed. The shielding layer 21X can prevent light leakage from the interpixel region. The wire 11 also passes through the interpixel region, crossing the shielding layer 21X. In this structure, in particular, light leakage occurs due to orientation irregularity of liquid crystal since outer edges of the insulating film 14 have a level difference. In addition, the substrate that has the insulating film 14 formed thereon and the substrate that has the shielding layer 21X formed thereon are separate. Thus, there is a possibility that a shift in pair of the substrates may cause light leakage.

In addition, as described above, the shielding layer 21X covers the entirety of the periphery of the pixel SP. Thus, considering the effect of the pair of substrates, it is difficult to set the area of the pixel SP to be large. Accordingly, in particular, the reflective display region area cannot be sufficiently reserved, thus causing a problem in that reflective display looks dark.

SUMMARY

An advantage of some aspects of the invention is that, regarding a liquid crystal device including a reflective display region and a transparent display region, by suppressing light leakage, a structure for reserving a sufficient pixel area is realized, while achieving improvement in contrast.

A liquid crystal device according to an aspect of the invention has a plurality of pixels arranged therein. The liquid crystal device includes a first substrate, a second substrate opposing the first substrate, liquid crystal provided between the first substrate and the second substrate, wires formed on the first substrate, and a reflective layer formed on the first substrate. Each pixel has a reflective display region formed by the reflective layer and a transparent display region without the reflective layer, and each wire is routed between two pixels in the transparent display region and in the reflective display region.

According to an embodiment of the invention, in the reflective display region, the wire does not reduce the area of the reflective display region, and, in the transparent display region, the wire is routed between pixels, thus preventing an aperture ratio from decreasing. Thus, an area usable for displaying can be increased.

A liquid crystal device according to another aspect of the invention has a plurality of pixels arranged therein. The liquid crystal device includes a first substrate, a second substrate opposing the first substrate, liquid crystal provided between the first substrate and the second substrate, wires formed on the first substrate, and a reflective layer formed on the first substrate. Each pixel has a reflective display region formed by the reflective layer and a transparent display region without the reflective layer. An interpixel region between adjacent pixels includes an adjacent reflective zone adjacent to the reflective display region, and an adjacent transparent zone adjacent to the transparent display region. The wire passes behind the reflective layer in the reflective display region and passes through the adjacent transparent zone, and the first light-shielding layer is formed on the first substrate in the adjacent reflective zone.

According to an embodiment of the invention, the wire on the first substrate passes through the reflective display region and the adjacent transparent zone of the interpixel region, whereby the wire has almost no optical effect on any of the reflective display region and the transparent display region. In addition, in the adjacent reflective zone, the first light-shielding layer is formed on the first substrate, whereby there is no possibility that a shift in pair of substrates may occur as in a case in which a light-shielding layer is formed on the second layer. Thus, a large area of the reflective display region can be ensured, maintaining a light shielding effect, thus increasing the brightness of reflective display.

In particular, by providing the first light-shielding layer behind the reflective layer, the reflective layer cannot be covered by the first light-shielding layer. Thus, the area of the reflective display region can be further increased.

According to an embodiment of the invention, preferably, a second light-shielding layer is formed on the second substrate in the adjacent transparent zone. In this case, by forming the second light-shielding layer on the second substrate in the adjacent transparent zone, the need to form the light-shielding layer on the first substrate is eliminated. Thus, it is not necessary to complicate the device structure, such as insulating the wire layer and light-shielding layer formed on the first substrate from each other with an interlayer insulating film. In addition, misorientation of liquid crystal can be prevented from occurring in an edge portion adjacent to the adjacent transparent zone due to a level difference generated by forming the light-shielding layer.

According to an embodiment of the invention, it is preferable that an interlayer insulating film be formed between the wires and the reflective layer, and it is preferable that the interlayer insulating film be formed in the reflective display region but be not in the transparent display region. By forming the interlayer insulating film between the wires and the reflective layer, insulating between both can be ensured, and, by forming no interlayer insulating film in the transparent display region, the thickness of the liquid crystal can be made thinner in the reflective display region than in the transparent display region. Thus, a difference in retardation between both regions can be reduced.

According to an embodiment of the invention, an interlayer insulating film may be formed between the wires and the reflective layer. The interlayer insulating film may be formed in the reflective display region and may be formed thinner in the transparent display region than in the reflective display region. Even if the interlayer insulating film is formed thicker in the reflective display region and is formed thinner in the transparent display region, similarly to the above case, the difference in retardation between both regions can be reduced.

According to an embodiment of the invention, preferably, the adjacent reflective zone includes a reflective boundary portion provided between the reflective display regions of the two adjacent pixels, and the first light-shielding layer is formed in the reflective boundary portion. This can avoid an effect of the shift in pair of substrates, ensuring that the reflective boundary portion is shielded from light since the first light-shielding layer is formed in the reflective boundary portion. Thus, the areas of the reflective display regions on both sides can be sufficiently ensured.

In this case, by forming an interlayer insulating film also in the reflective boundary portion, misorientation of liquid crystal can be suppressed in the vicinity of the reflective boundary portion due to the level difference of the interlayer insulating film.

According to an embodiment of the invention, preferably, the adjacent transparent zone includes a transparent boundary portion provided between the transparent display regions of the two adjacent pixels, and the wire is provided in the transparent boundary portion. In this case, by providing the wire also in the transparent boundary portion, an overlapping area between the wire and the reflective layer can be reduced. Thus, parasitic capacitance generated between the wire and the reflective layer can be reduced, thus reducing the level shift to enable a reduced driving voltage.

In addition, the wire is provided behind the reflective layer in the reflective display region and is provided in the transparent boundary portion. Thus, when the area ratio between the reflective display region and the transparent display region is changed, the length of the wire, which passes through the reflective display region, and the length of the wire, which passes through the transparent display region, can be changed in response to a change in the area ratio. Therefore, even if liquid crystal capacitance is changed on the basis of a change in average thickness of liquid crystal occurring in response to the change in the area ratio, the parasitic capacitance between the wire and a pixel electrode is also changed by the change in the area ratio. This can reduce an effect on an electro-optical characteristic of the pixel. In particular, when each pixel is provided with a switching element, an element capacitor of the switching element and the above parasitic capacitor are connected in parallel. Thus, a change in ratio (capacitance ratio) between the liquid crystal capacitance and the sum of the element capacitance and the parasitic capacitance can be reduced. Therefore, it is difficult for the level shift to change, even if the area ratio is changed. Thus, design change of the liquid crystal device can be facilitated such as suppressing complexly of device design.

In this case, by forming no interlayer insulating film also in the transparent boundary portion, misorientation of liquid crystal caused by the level difference of the interlayer insulating film can be suppressed in the vicinity of the transparent boundary portion.

According to an embodiment of the invention, it is preferable that a boundary line between the reflective display region and the transparent display region in the pixel cross a direction in which the wire extends. This enables providing the wire so as to sequentially pass through the reflective display region and the transparent display region in the extending direction of the wire. In addition, by moving the boundary line in the extending direction of the wire, a change in capacitance occurring when the area ratio between the reflective display region and the transparent display region is changed can be suppressed.

Next, a liquid crystal device according to another aspect of the invention has a plurality of pixels arranged. The liquid crystal device includes a first substrate, a second substrate opposing the first substrate, liquid crystal provided between the first substrate and the second substrate, wires formed on the first substrate, switching elements formed on the first substrate, the switching elements electrically connecting to the wires, an insulating layer, a reflective layer formed above the wires and the switching elements, with the insulating layer provided between the reflective layer, and the wires and switching elements formed on the first substrate, and a first light-shielding layer. An interpixel region between two adjacent pixels includes an adjacent reflective zone adjacent to the reflective display region and an adjacent reflective zone adjacent to the transparent display region. Each wire passes behind the reflective layer in the reflective display region and passes through the adjacent transparent zone. In the adjacent reflective zone, the first light-shielding layer is formed on the first substrate.

According to an embodiment of the invention, it is preferable that the first light-shielding layer be formed of a material identical to a material of at least one layer included in the wire or each switching element. In this case, by forming the first light-shielding layer with a material identical to a material of at least one layer included in the wire or each switching element, the need to additionally provide a step for forming only the first light-shielding layer is eliminated, thus avoiding an increase in production cost.

An electronic apparatus according to another aspect of the invention includes one of the above-described liquid crystal devices. The electronic apparatus is not limited to a particular type of electronic apparatus. However, each liquid crystal device is suitable in configuration for use in configuring a semi-transparent reflective liquid crystal device. Therefore, from points in that the liquid crystal device is capable of power saving and has good visibility in the field, the electronic apparatus is preferably a piece of portable electronic equipment such as a cellular phone, a notebook personal computer, a portable information terminal, or an electronic watch/clock.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
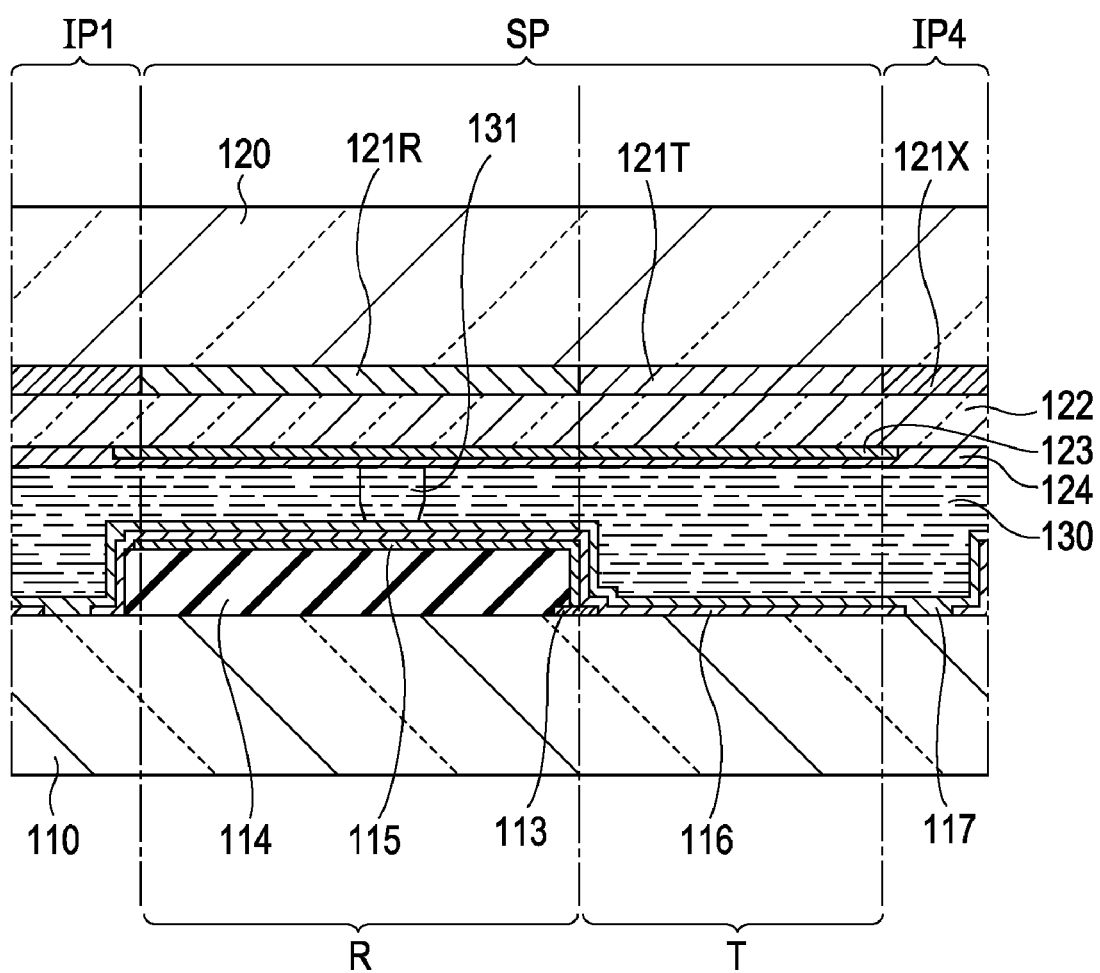
FIG. 1 is a partially enlarged longitudinal sectional view of a pixel structure of a liquid crystal device according to an embodiment of the invention.
Figure 2:
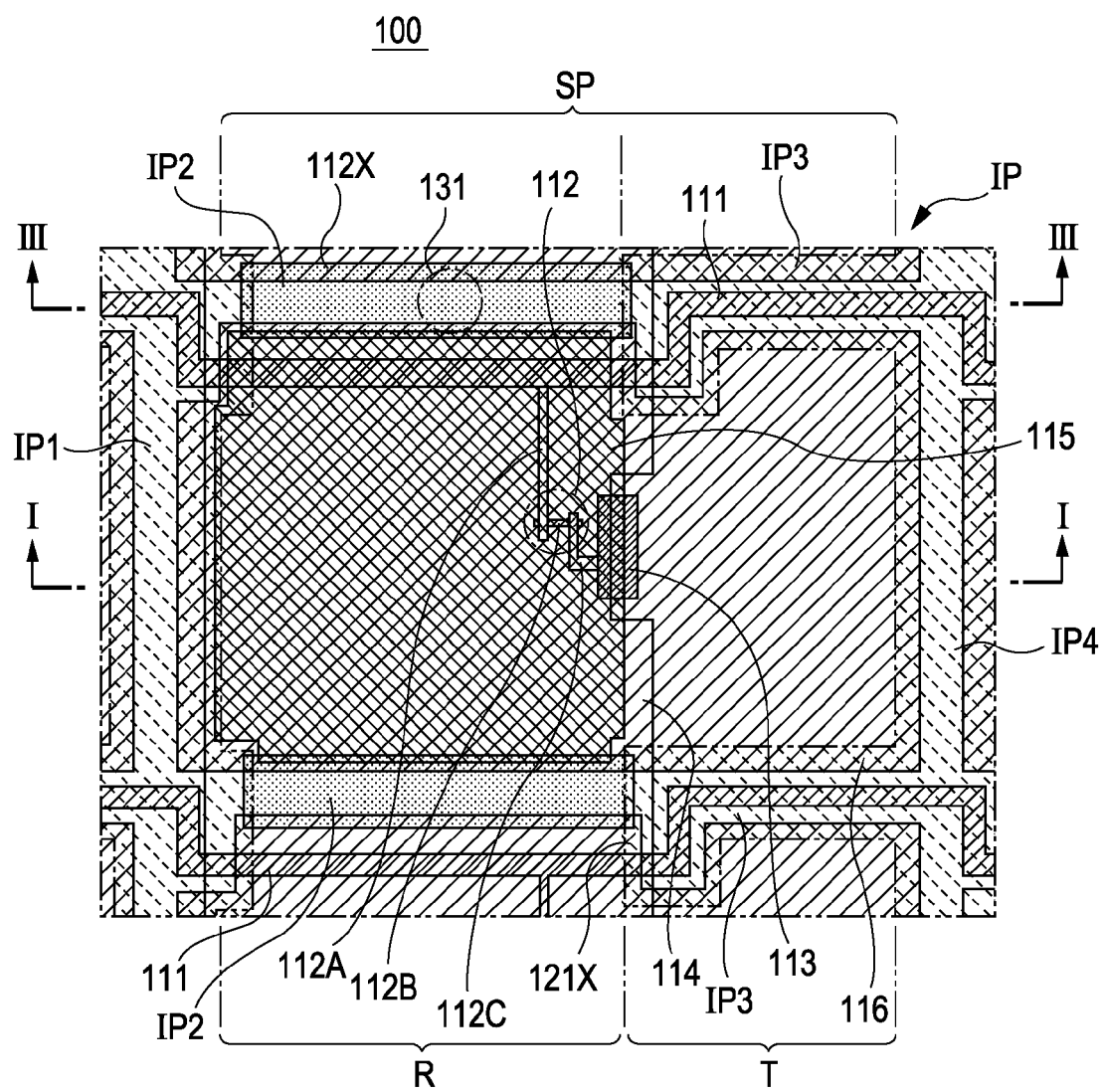
FIG. 2 is a partially enlarged plan view of the embodiment.
Figure 3:
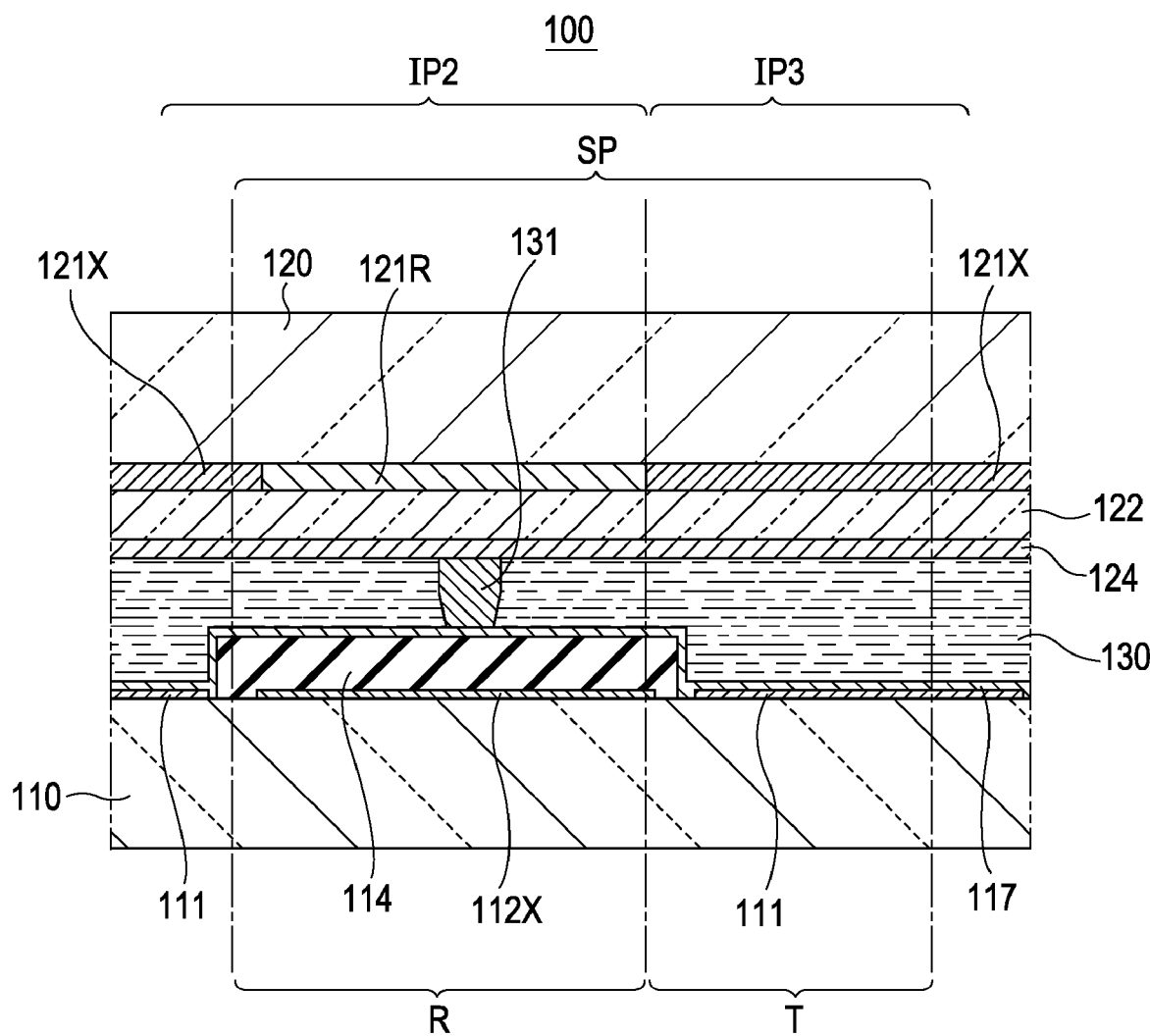
FIG. 3 is a partially enlarged longitudinal sectional view showing another section of the pixel structure of the embodiment.

An embodiment of the invention is described below with reference to the accompanying drawings. FIG. 1 is a partially enlarged longitudinal view (taken along the line I-I shown in FIG. 2) of a pixel structure of a liquid crystal device 100. FIG. 2 is a partially enlarged plan view of the liquid crystal device 100. FIG. 3 is a partially enlarged longitudinal view (taken along the line III-III shown in FIG. 2) of the liquid crystal device 100.

The liquid crystal device 100 is formed by laminating a first substrate 110 and a second substrate 120 which are made of material such as glass or plastic with a sealant or the like (not shown), and providing (encapsulating liquid crystal 130 between the first substrate 110 and the second substrate 120. The distance between the first substrate 110 and the second substrate 120 is defined by a spacer 131.

In the shown example, a planar shape of a pixel SP is substantially rectangular. The pixel SP has a reflective display region R on one side (the left side in FIG. 2) of the pixel SP, and a transparent display region T on the opposite side (the right side in FIG. 2). In the shown example, the planar shapes of the reflective display region R and the transparent display region T are substantially rectangular. In a color display unit, a set of the smallest optical control units (the smallest units separately realize optical control) forms the smallest display unit (pixel) that determines a display form. In this specification, the invention relates to a structure for driving the smallest optical control units. Thus, the smallest optical control units (subpixels) are hereinafter referred to as the pixels.

As shown in FIG. 2, interpixel regions IP are provided around the pixel SP. Each of the interpixel regions IP is formed between the pixels. The interpixel regions IP include adjacent reflective zones IP1 and IP2 which are adjacent to the reflective display region R of the pixel SP in the center of FIG. 2, and adjacent transparent zones IP3 and IP4 which are adjacent to the reflective display region R of the pixel SP in the center of FIG. 2. One adjacent reflective zone includes an adjacent reflective boundary portion included in the adjacent reflective zone IP2 adjacent to a reflective display region R of another adjacent pixel. The other adjacent reflective zone includes an adjacent reflective boundary portion IP3 adjacent to a transparent display region T of another adjacent pixel. In the shown example, IP1, IP2, IP3, and IP4 are formed linear.

The first substrate 110 has wires 111 and switching elements 112 formed thereon. In this embodiment, the wires 111 are data lines, and the switching elements 112 are two-terminal nonlinear elements such as TFDs (thin film diodes).

In the shown example, each wire 111 has, for example, a layered structure including a first layer formed of Ta or the like and a second layer formed of Cr or the like. Each switching element 112 includes a first metal layer 112A, formed of Cr or the like, conductively connected to the wire 111, a second metal layer 112B, formed of Ta or the like, joined to the first metal layer 112A, with an insulating film (not shown) provided therebetween. and a third metal layer 112C, formed of Cr or the like, joined to the second metal layer 112B, with an insulating film (not shown) provided therebetween. A joining structure of the first metal layer 112A and the second metal layer 112B forms a first diode element, and a joining structure of the second metal layer 112B and the third metal layer 112C forms a so-called "back-to-back structure" in which a second diode element is connected in series, with its attitude directed in a reverse direction, and in which, preferably, the first metal layer 112A and the third metal layer 112C are formed of the same material. The third metal layer 112C is connected to a conductive contact portion 113 for establishing conductive connection to a pixel electrode (described later). In addition, by using one or more layers included in the switching element 112 to form the wire 111, a production process can be simplified.

The wires 111 are formed correspondingly to rows of pixels SP, which are horizontally arranged in FIG. 2, and are conductively connected to the switching elements 112 in the pixels SP, which belong to the rows of pixels. The wire 111 extends alternately passing through the reflective display region R and the transparent border portion IP3, and has a serpentine planar pattern in which an arrangement pitch of the pixels SP is used as a cycle. Specifically, the wire 111 bends outward in a portion from the reflective display region R to the transparent boundary portion IP3, and bends inward along the boundary between the interpixel region and the next reflective display region R in a portion from the transparent boundary portion IP3 to the next reflective display region R. The wire 111 repeats this wiring form. Each boundary line (the vertically extending imaginary lines shown in FIG. 2) between the reflective display region R and the transparent display region T in the pixel SP can cross (in FIG. 2, can be orthogonal to) extending directions (horizontally in FIG. 2) of the entire wires 111.

In the example shown in FIG. 2, the wire 111 reaches the interpixel region IP3 from the reflective display region R before bending. However, the wire 111 may bend in the reflective display region R before reaching the interpixel region IP2 or IP3. After the wire 111 reaches the interpixel region, it bends again before extending to the interpixel region IP3.

The reflective boundary portion IP2 has a first shielding layer 112X formed thereon. The first shielding layer 112X is formed by at least one layer (the same material) among the layers forming the wire 111 and the switching element 112. This eliminates the need to provide an additional step for forming the first shielding layer 112X. In cases such as when the wires 111, the switching elements 112, and the conductive contact portion 113 are simultaneously formed, and when the conductive contact portion 113 is formed immediately after the wires 111 and the switching elements 112 are formed, the first shielding layer 112X may be formed by the same layer as the conductive contact portion 113.

The first shielding layer 112X is electrically insulated from the wire 111 and the switching element 112. This can form parasitic capacitance (described later) so as not to unnecessarily increase. In the example shown in FIG. 2, the first shielding layer 112X has a sufficient two-dimensional distance from the wire 111 for establishing necessary insulation. The first shielding layer 112X is formed so as to cover the entirety of the reflective boundary portion IP2. Specifically, the first shielding layer 112X is formed so as not to have any planar gaps to reflective layers (described later) formed on both sides of the reflective boundary portion IP2, and preferably so as to two-dimensionally overlap with the formed reflective layers.

The wire 111, the switching element 112, and the first shielding layer 112X have an interlayer insulating film 114 formed thereon. The interlayer insulating film 114 is formed in the reflective display region R, but is not formed in the transparent display region T. This forms a level difference for the thickness of the interlayer insulating film 114 between the reflective display region R and the transparent display region T. In the case of the example shown in FIGS. 1 and 2, the interlayer insulating film 114 is formed not only in the reflective display region R but also in the reflective boundary portion IP2, which is adjacent thereto. By forming the interlayer insulating film 114 also in the reflective boundary portion IP2, the interlayer insulating film 114 can continuously be formed between adjacent pixels SP. Thus, the level difference for the thickness of the interlayer insulating film 114 can be prevented from being formed between the reflective boundary portion IP2 and the reflective display region R. This suppresses misorientation of liquid crystal in the outer edge portions of the reflective display region R. Even in a case in which the interlayer insulating film 114 is formed thick in the reflective display region R and is formed thin in the transparent display region T, although this case differs from the embodiment, similarly to the case of the embodiment, the level difference for the thickness of the interlayer insulating film 114 can be formed between the reflective display region R and the transparent display region T.

The interlayer insulating film 114 is formed with at least a portion of the conductive contact portion 113 exposed. The conductive contact portion 113 is formed in the vicinity of the boundary between the reflective display region R and the transparent display region T, with a portion of the conductive contact portion 113 extended from an outer edge portion of the interlayer insulating film 114.

Although it is preferable that the interlayer insulating film 114 be formed of a resin material such as, for example, acrylic resin, the material is not particularly limited if it is an insulator. In a method for forming the interlayer insulating film 114, it is preferable to perform, for example, applying photosensitive resin on a substrate, and pattern formation with a photolithography using exposure and development.

The interlayer insulating film 114 is used not only for forming the above level difference, but also for forming a scattering reflective surface on the reflective layer (described above). In other words, by using an exposure pattern by the lithography in which fine apertures are distributively arranged, fine irregularities are formed on a surface of the interlayer insulating film 114. By forming a reflective layer 115 on the surface fine irregularities in the form of a thin film, the surface of the reflective layer 115 becomes a scattering reflective surface having fine irregularities.

The reflective layer 115 is formed as a thin film formed by vapor deposition or sputtering with high optical reflectance metal material such as Al or Ag. The reflective layer 115 is formed covering the reflective display region R. The reflective layer 115 is electrically insulated from the wire 111 and the switching element 112, which are provided below the reflective layer 115, by providing the interlayer insulating film 114 therebetween. The wire 111 and the switching element 112 are disposed behind the reflective layer 115 (a backward position from a viewpoint side) so as to be two-dimensionally covered by the reflective layer 115. Therefore, the wire 111 and the switching element 112 do not optically affect the reflective display region R.

A pixel electrode 116 is formed on the reflective layer 115, the pixel electrode 116 being formed of a transparent conductor such as ITO. The pixel electrode 116 can be formed by vapor deposition and sputtering. The pixel electrode 116 is formed covering both the reflective display region R and the transparent display region T. The reflective layer 115 and the pixel electrode 116 may be overlaid, with both insulated from each other by a transparent insulating layer provided therebetween. However, in this embodiment, the reflective layer 115 and the pixel electrode 116 are formed, with both abutting on each other to be electrically connected. The pixel electrode 116 is conductively connected to the switching element 112 by the conductive contact portion 113. The conductive contact portion 113 may be conductively connected to the pixel electrode 116 by the reflective layer 115, and may be conductively connected both to the reflective layer 115 and to the pixel electrode 116. The pixel electrode 116 has a plane pattern that does not overlap with a portion of the wire 111 in the transparent boundary portion IP3 after the portion is led from the reflective display region R. The wire 111 and the pixel electrode 116 have a sufficient distance therebetween so that both are electrically insulated from each other.

On the first substrate 110 on which the above-described layers are laminated, an alignment film 117 formed of polyimide resin is formed. The alignment film 117 is used to provide the liquid crystal 130 with an initial orientation state, and is formed of an appropriate material depending on the liquid crystal 130. When a TN (twisted nematic) mode liquid crystal unit using TN liquid crystal is formed by applying polyimide resin on a substrate, burning the resin applied substrate, and performing rubbing that rubs with rubbing cloth in a predetermined direction.

On the second substrate 120, color layers 121R and 121T that form a second shielding layer 121X and a color filter are formed. The color layer 121R is a reflective display color layer formed in the reflective display region R, and the color layer 121T is a transparent display color layer formed in the transparent display region T. Optical paths differ between reflective display and transparent display. Thus, by providing different color layers in the reflective display region R and the transparent display region T, visibility and reproducibility of both types of display can be enhanced. However, color layers that are common to both reflective display region R and the transparent display region T may be formed. Although FIG. 1 shows only the color layers 121R and 121T in one pixel SP, color layers in different colors are provided in other pixels SP since a color filter is normally formed by disposing, for each pixel, color layers having a plurality of colors in a predetermined pattern. For example, by disposing a different set of color layers having three colors, R (red), G (green), and B (blue) for each pixel, predetermined color reproducibility can be obtained in the smallest display unit (pixel) formed by three subpixels.

The second shielding layer 121X may be formed as a layer formed by laminating the color layers having a plurality of colors, a layer formed of a thin film of Cr or the like, or a layer formed of black resin (black matrix). The second shielding layer 121X is formed shielding IP1, IP3, and IP4 as interpixel regions from light. In other words, in the case of the embodiment, in the interpixel region (the adjacent reflective zone, more specifically, the reflective boundary portion) IP2, the first substrate 110 has the first shielding layer 112X formed thereon. Thus, by forming the second shielding layer 121X in the interpixel regions except the IP2, the entire interpixel regions can be shielded from light.

The color layers 121R and 121T, and the second shielding layer 121X have a transparent protection film 122 formed thereon. The transparent protection film 122 is used to prevent impurities from entering the color layers 121R and 121T and to flatten their surfaces. The transparent protection film 122 has a counter electrode 123 formed thereon, the counter electrode 123 being formed of a transparent conductor such as ITO. The counter electrode 123 is a band electrode extending in a direction (the vertical direction in FIG. 2, the direction perpendicular to the plane of each of FIGS. 1 and 3) perpendicular to a direction in which the wire 111 extends. As a whole, a plurality of counter electrodes 123 are arranged in stripes. A predetermined electric field for controlling the liquid crystal 130 for each pixel SP is applied between the counter electrode 123 and the pixel electrode 116. The counter electrode 123 has an alignment film 124 formed thereon. The alignment film 124 is similar to the alignment film 117.

In this embodiment, as shown in FIG. 2, by providing the first shielding layer 112X on the first substrate 110 in the reflective boundary portion IP2 as the adjacent reflective zone adjacent to the reflective display region R among the interpixel regions, an effect of the shift in pair of substrates can be reduced compared with a case in which the reflective boundary portion IP2 is shielded from light by the shielding layer provided on the second substrate 120. A contrast decrease due to light leakage can be suppressed and an enlarged area of the reflective display region R can increase the brightness of reflective display. In particular, in this embodiment, since the switching element 112 is disposed behind the reflective layer 115, light leakage of the reflective boundary portion IP2 is prevented and there is no possibility that the reflective layer 115 is covered by the first shielding layer 112X. Thus, the reflective display region R can be further expanded, and, in addition, display quality of reflective display can be enhanced.

In addition, in this embodiment, by disposing the wire 111 in the reflective display region R and the transparent boundary portion IP3, optical effects of the wire 111 both on reflective display and transparent display can be avoided, and parasitic capacitance generated between the wire 111 and the pixel electrode 116 can be suppressed. This enables a reduced driving voltage. In other words, although the wire 111 can be disposed only in an interpixel region excluding the reflective display region R and the transparent boundary portion IP3, in this case, a large parasitic capacitance is generated between the wire 111 and the pixel electrode 116, so that a decrease in capacitance ratio increases the driving voltage.

Furthermore, in this embodiment, as described above, the wire 111 is disposed so as to sequentially pass in the reflective display region R and the transparent boundary portion IP3 in the same direction. Accordingly, when an area ratio between the reflective display region R and the transparent display region T is altered by shifting the boundary line between both to the pass direction of the wire 111, the parasitic capacitance generated between the wire 111 and the pixel electrode 116 changes with the change in area ratio, whereby the change in capacitance ratio can be suppressed. Thus, since electro-optical characteristics do not greatly change even if the design is changed concerning a change in area ratio, the need to adjust portions with a change in driving voltage characteristic is eliminated, thus facilitating change in design.

Figure 4A:
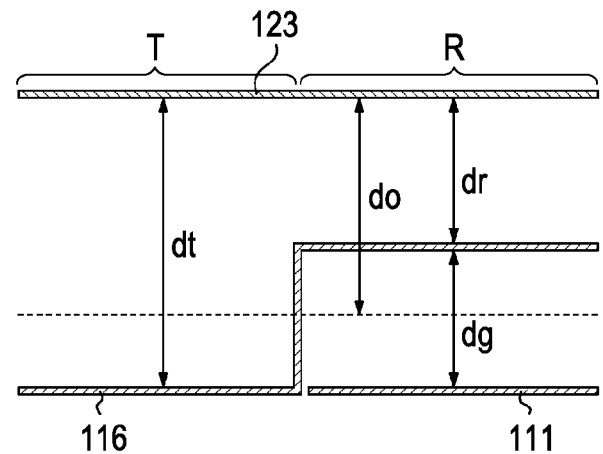
FIGS. 4A and 4B are schematic illustrations of an electrode structure of the pixel according to the embodiment.
Figure 4B:
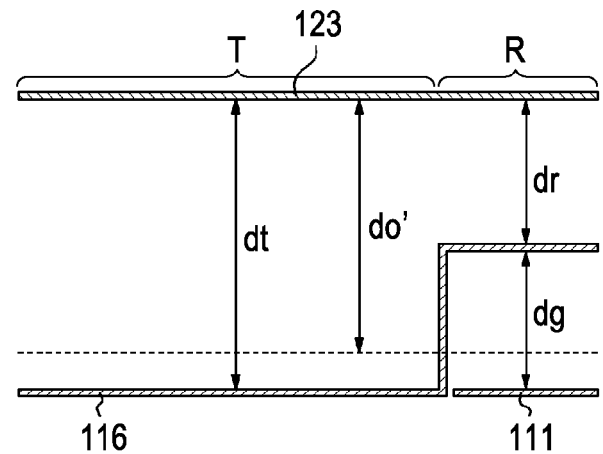
Figure 5:
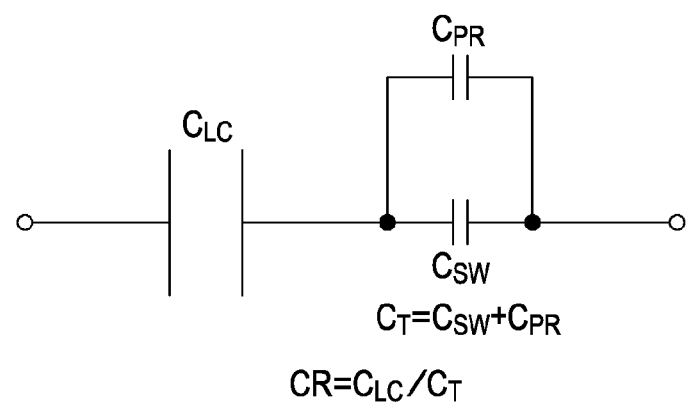
FIG. 5 is an equivalent circuit diagram of the pixel according to the embodiment.
Figure 6:
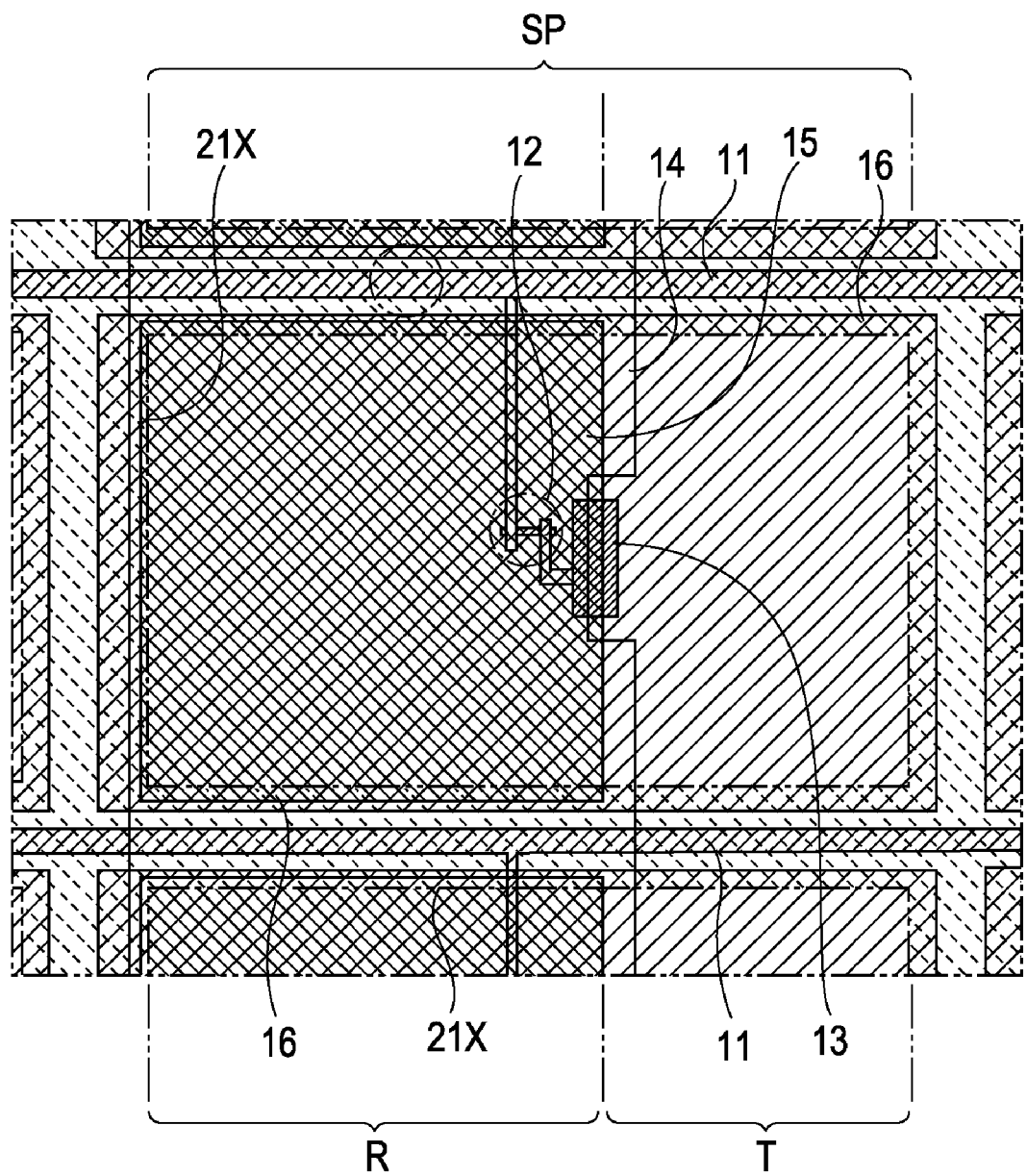
FIG. 6 is a partially enlarged plan view of a comparative example having a structure different from that of the pixel according to the embodiment.

This point is further described with reference to FIGS. 4A, 4B, and 5. FIGS. 4A and 4B are schematic illustrations of an electrode arrangement in the pixel SP in the liquid crystal device 100 according to this embodiment. FIG. 5 is an equivalent circuit diagram of the pixel SP. The pixel SP in this embodiment includes liquid crystal capacitance $C_{LC}$ formed in a pixel structure in which the pixel electrode 116 and the counter electrode 123 oppose each other, with the liquid crystal 130, which has thickness dt or dr, provided therebetween. In addition, the pixel SP in this embodiment includes parasitic capacitance $C_{PR}$ generated in the structure of the first substrate 110 in which, in the reflective display region R, the pixel electrode 116 and the wire 111 oppose each other, with the interlayer insulating film 114, which has thickness dg, provided therebetween. The parasitic capacitor $C_{PR}$ is connected in series to the liquid crystal capacitor $C_{LC}$, as shown in FIG. 5.

Since the pixel SP includes the switching element 112, as shown in FIG. 5, an element capacitor $C_{SW}$ of the switching element 112 exists in the equivalent circuit. The element capacitor $C_{SW}$ exists between the wire 111 and the pixel electrode 116. Thus, as shown in FIG. 5, the element capacitor $C_{SW}$ is connected in parallel to the parasitic capacitor $C_{PR}$, and is connected in series to the liquid crystal capacitor $C_{LC}$. When the switching element 112 is turned on, the driving voltage is applied to the liquid crystal capacitor $C_{LC}$. When the switching element 112 is turned off, electric charge stored in the liquid crystal capacitor $C_{LC}$ is re-distributed to the element capacitor $C_{SW}$ and the parasitic capacitor $C_{PR}$. Thus, a so-called "level shift" occurs in which the voltage applied to the liquid crystal capacitor $C_{LC}$ drops. The amount of the level shift is changed if there is a change in capacitance ratio, represented by $CR = C_{LC}/(C_{SW}+C_{PR}) = C_{LC}/C_T$, even if the same driving voltage is applied. Normally, the driving voltage needs to be supplied considering the level shift. An increase in the value of the parasitic capacitance $C_{PR}$ increases the amount of the level shift. Thus, by reducing the parasitic capacitance, the driving voltage can also be lowered.

In addition, the capacitance ratio CR changes depending on also a change in area ratio between the reflective display region R and transparent display region T in the pixel SP. Specifically, when the state shown in FIG. 4A changes to the state shown in FIG. 4B, the area of the reflective display region R decreases and the area of the transparent display region T increases. Accordingly, since electrode distance dr (the thickness of the liquid crystal 130) between the pixel electrode 116 and the counter electrode 123 in the reflective display region R is less than an electrode distance dt between those, the average electrode distance increases from do to do', resulting in a decrease in value of liquid crystal capacitance $C_{LC}$. In addition, when the boundary line between the reflective display region R and the transparent display region T moves in an extending direction of the wire 111, so that the area of the reflective display region R decreases, an area in which the pixel electrode 116 (and the reflective layer 115) and the wire 111 oppose each other decreases although the distance dg (the thickness of the interlayer insulating film 114) between both does not change. Thus, the value of parasitic capacitance $C_{PR}$ also decreases. Therefore, both the numerator and denominator of the capacitance ratio change in the same increase/decrease manner, whereby a change in capacitance ratio CR itself is suppressed.

In the case of a semi-transparent reflective liquid crystal device, the area ratio between the reflective display region R and the transparent display region T is very important in optimizing display manners of reflective display and transparent display, and in reducing differences between both. In particular, the area ratio between the reflective display region R and the transparent display region T has a large effect on setting of reflective display brightness. Accordingly, the need to adjust the area ratio between both is very high. However, in this embodiment, in order to change the area ratio, by moving the boundary line between both regions in the extending direction of the wire 111, a change in level shift can be controlled, as described above. Thus, as setting or the like of the driving voltage is more facilitated, a necessary time and effort in design can be more reduced, thus facilitating design change.

Figure 7:
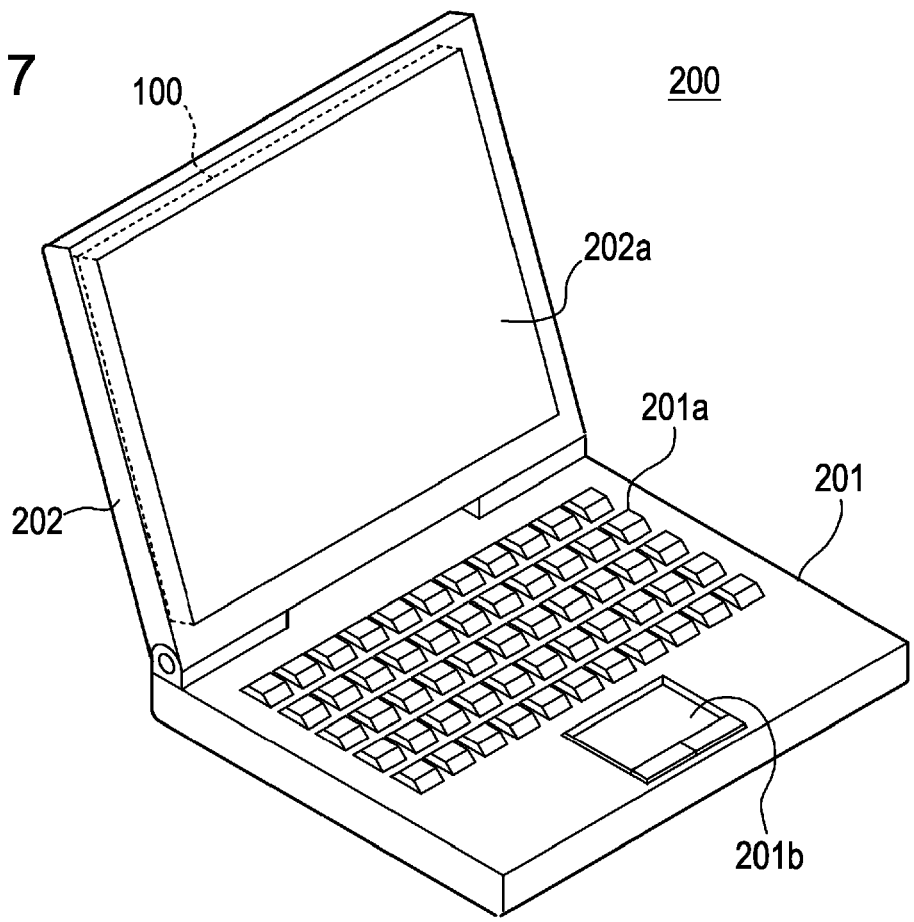
FIG. 7 is a perspective schematic view of an example of an electronic apparatus provided with the liquid crystal device according to the embodiment.

Finally, an electronic apparatus according to an embodiment of the invention is described below with reference to FIGS. 7 and 8. FIG. 7 is a perspective schematic view of a notebook personal computer 200 as the electronic apparatus according to the embodiment. The personal computer 200 includes a main unit 201 including a plurality of operating buttons 201a and an operating device 201b, and a display unit 202, connected to the main unit 201, including a display screen 202a. In the example shown in FIG. 7, the main unit 201 and the display unit 202 can be opened and closed. The above-described liquid crystal device 100 is built into the display unit 202, and the liquid crystal device 100 can display a desired display image on the display screen 202a. In this case, the personal computer 200 includes a display control circuit for controlling the liquid crystal device 100. The display control circuit can determine an operation mode of the liquid crystal device 100 by sending a video signal, input data, and predetermined control signals to a driving circuit (not shown) of the liquid crystal device 100.

Figure 8:
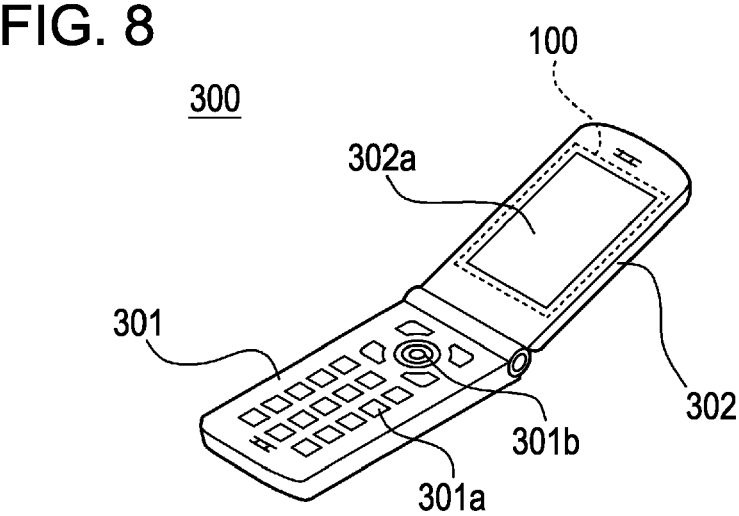
FIG. 8 is a perspective schematic view of another example of an electronic apparatus provided with the liquid crystal device according to the embodiment.

FIG. 8 is a perspective schematic view of a cellular phone 300 that is another electronic apparatus according to an embodiment of the invention. The cellular phone 300 shown in FIG. 8 includes an operating unit 301 including a plurality of operating buttons 301a and 301b, and a mouthpiece, and a display unit 302 including a display screen 302a and an earpiece. The above-described liquid crystal device 100 is built into the display unit 302. On the display screen 302a of the display unit 302, a display image formed by the liquid crystal device 100 can be viewed. In this case, the cellular phone 300 includes a display control circuit for controlling the liquid crystal device 100. The display control circuit can determine an operation mode of the liquid crystal device 100 by sending a video signal, input data, and predetermined control signals to a driving circuit (not shown) of the liquid crystal device 100.

The electro-optical apparatus according to each embodiment of the invention is not limited to the above shown examples, but may be variously modified within departing the gist of the invention. For example, the liquid crystal devices according to the above embodiments have been described as those including switching elements forming two-terminal nonlinear elements. However, the invention is similarly applicable to even a liquid crystal device using a three-terminal nonlinear element, such as a TFT, as a switching element. For example, at least one of two wires (a scanning line and a data line) connected to a switching element may be configured so as to correspond to the above-described wire 111.

The entire disclosure of Japanese Patent Application No. 2006-068766, filed Mar. 14, 2006 is expressly incorporated by reference herein.

What is claimed is:

1. A liquid crystal device comprising a plurality of pixels each having a switching element, the liquid crystal device further comprising:
   a first substrate;
   a second substrate opposing the first substrate;
   a liquid crystal material provided between the first substrate and the second substrate;
   wires formed on the first substrate and electrically, respectively connected to the switching elements which are also formed on the first substrate;
   a reflective layer formed above the wires and the switching elements;
   an insulating layer provided between (i) the reflective layer and (ii) the wires and switching elements formed on the first substrate; and
   a first light-shielding layer,
   wherein:
   each pixel has a reflective display region formed by the reflective layer and a transparent display region without the reflective layer; and
   for each pixel,
      an interpixel region between said pixel and adjacent pixels includes a first zone adjacent to the reflective display region of said pixel, and a second zone adjacent to the transparent display region of said pixel,
      one of the wires passes between the reflective layer and the first substrate in the reflective display region and passes through the first zone,
      said wire continuously extends across said pixel and at least one adjacent pixel and is electrically connected to the switching elements of said pixel and said at least one adjacent pixel, and
      the first light-shielding layer is formed on the first substrate in the first zone;
   the first light-shielding layer is formed of a material identical to a material of at least one layer included in the wire or each switching element; and
   the wire serpentinely extends in the vicinity of the reflective display region and the transparent display region so as to bypass the first light-shielding layer.

* * * * *